March 16, 1937.  E. D. TURNBULL  2,073,817
METHOD OF TREATING WET BASIC CARBONATE WHITE LEAD PULP
Filed Oct. 27, 1933
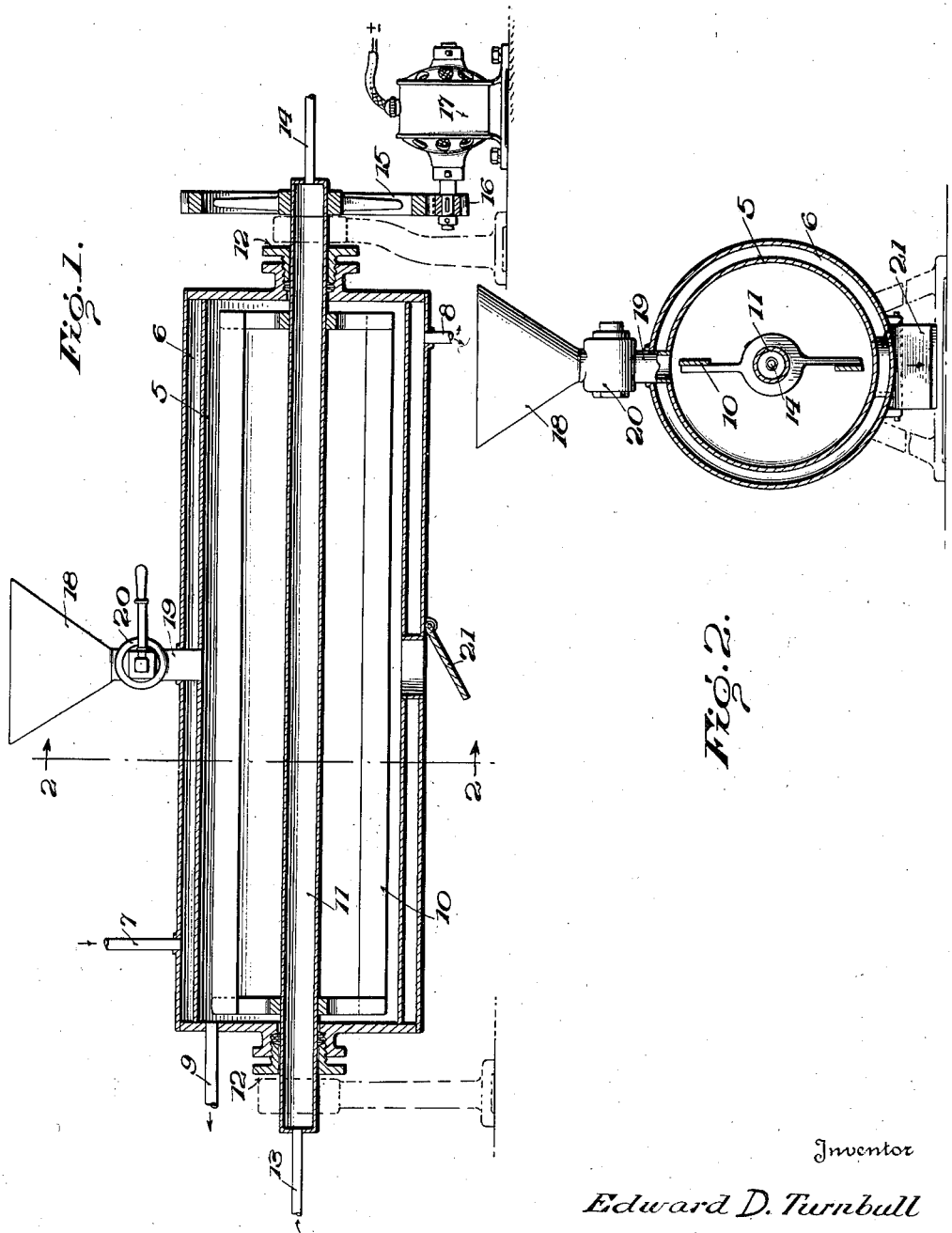
Inventor
Edward D. Turnbull
By
Attorney Patented Mar. 16, 1937

2,073,817

UNITED STATES PATENT OFFICE 2,073,817

METHOD OF TREATING WET BASIC CARBONATE WHITE LEAD PULP

Edward D. Turnbull, Scranton, Pa., assignor to The Glidden Company, Cleveland, Ohio, a corporation of Ohio Application October 27, 1933, Serial No. 695,545

10 Claims. (Cl. 134—72)

My invention relates to a method of treating wet basic carbonate white lead pulp.

An important object of my invention is to provide a method for drying the wet basic carbonate white lead pulp and changing the characteristics of the resultant dry basic carbonate white lead powdered pigment, whereby the oil absorption capacity and bodying action of the white lead pigment are both reduced, and a larger proportion of the white lead pigment in oil may be used to obtain a standard body of paint.

A further object of the invention is to provide a method of the above-mentioned character, whereby the resultant dry basic carbonate white lead powdered pigment may be employed in producing a paint having an increased amount of pigment per unit of paint with the same brushing and flowing characteristics, thereby producing a paint of improved wearing characteristics.

The present application is in part a continuation of my application for method of treating white lead, filed Jan. 10, 1931, Serial Number 507,998.

In the accompanying drawing forming a part of this specification, and in which like numerals are employed to designate like parts throughout the same.

Figure 1 is a central vertical longitudinal section apparatus, employed in the practice of my method, and, Figure 2 is a transverse section taken on line 2—2 of Figure 1.

In the production of basic carbonate white lead pulp, by any of the several methods in use, this basic carbonate white lead pulp is present with water and certain impurities, such as lead acetate, sodium acetate, and sodium carbonate. This basic carbonate white lead pulp is a water-wet mass of basic carbonate white lead having a constitutional formula of about "$2PbCO_3.Pb(OH)_2$," although the ratio of the $Pb(OH)_2$ may vary somewhat. This basic carbonate white lead is a different product from that known in the trade as "white lead" which is ordinarily used to designate basic carbonate white lead, which has been ground to a paste with linseed oil.

It is old in the art to treat this basic carbonate white lead pulp, in several ways. This treatment, old in the art, usually involves filtering, washing, and drying the material by heating at atmospheric pressure. The separation of the water from the basic carbonate white lead pigment may also be effected by the addition to the mass of raw linseed oil, before the heat treatment, at atmospheric pressure. This produces a paint, and the basic carbonate white lead powdered pigment is not produced as such. It has also been proposed to subject the basic carbonate white lead pulp, without washing, to heat treatment under vacuum.

I have discovered that if the basic carbonate white lead pulp is treated in accordance with my method, that the characteristics of the resultant dry basic carbonate white lead powdered pigment, are altered, with the result that the pigment has a reduced oil absorption capacity and a reduced bodying action. The resultant dry basic carbonate white lead powdered pigment produced by my method absorbs less oil than basic carbonate white lead powdered pigments produced by other methods, and my pigment, when ground in oil to produce a paint, also has a less body. This permits of the use of a larger proportion of the pigment in oil to obtain a standard body of paint. This means that there is more pigment per unit of paint with the same brushing and flowing characteristics, which produces a paint of improved wearing characteristics.

In the practice of my method, the basic carbonate white lead pulp, which may be produced by any of the well known methods, as before indicated, is present with water and other impurities, such as lead acetate, sodium acetate, and sodium carbonate. The first step in my method is to thoroughly and completely wash the basic carbonate white lead pulp to remove all traces of the water soluble lead acetate, sodium acetate, and sodium carbonate present. This washing may be effected by any of the well known methods. The pulp may be washed by counter-current decantation. It may also be washed by filtering the pulp in a filter-press and subsequently forcing water through the pulp or pigment cake in the press until all of the soluble salts have been dissolved and removed. The basic carbonate white lead pulp thus treated, before washing, contains approximately 1½% by weight of lead acetate, of which apparently 1% is present as water soluble lead acetate and therefore can be removed by washing, and ½% of this lead acetate is apparently adsorbed upon the white lead particles and cannot be removed by washing. However, this small amount of adsorbed lead acetate which is thus present in my final product, does not injuriously affect the same, provided the water soluble lead acetate has been removed by washing. The final product may also contain slight traces of the other salts which may become adsorbed upon the basic carbonate white lead particles, but these traces do not injuriously affect the product, when the corresponding water soluble salts are removed by washing. Other specimens of basic carbonate white lead pulp may contain a much larger percentage by weight of lead acetate. In some specimens the percentage of lead acetate present may reach as high as 20% by weight. In each case, the basic carbonate white lead pulp containing the lead acetate is thoroughly washed to remove substantially all traces of the water soluble lead acetate, the remaining relatively small amount of lead acetate adsorbed upon the white lead particles and cannot be removed by a thorough washing, does not act injuriously upon the finished product.

After the thorough washing of the pulp or pigment cake, it may then be filter-pressed for removing the excess water, with the result that the water-wet basic carbonate white lead pulp is obtained, containing basic carbonate white lead having about the constitutional formula, as before explained.

The resultant basic carbonate white lead pulp or pigment cake thus obtained, and free from substantially all traces of the water soluble salts, is now subjected to the action of heat under vacuum, to thoroughly dry the same for producing basic carbonate white lead powdered pigment.

To accomplish this drying operation, I preferably employ the apparatus shown in the accompanying drawing. This apparatus comprises a shell or casing 5, surrounded by a steam jacket 6, receiving steam through an inlet pipe 7, and having a condensate outlet pipe 8. The steam is preferably supplied at a pressure of 15 pounds per square inch. A vacuum is maintained or produced within the casing or shell 5, of preferably 20 to 25 inches of mercury, by means of a suitable vacuum pump connected with a pipe 9, in communication with the interior of the casing or shell 5, as shown. The 20 to 25 inches of mercury referred to is the distance between the elevations of the mercury in a U-tube, one arm of the U-tube being in communication with atmosphere and the other arm having communication with the casing or shell. A rotary agitator paddle 10 is arranged within the casing or shell 5, and is mounted upon a tubular shaft 11, operating through stuffing boxes 12. Steam is circulated through the tubular shaft 11, preferably at a pressure of 15 pounds per square inch, entering through the pipe 13 and discharging through the pipe 14. Steam supplied at a pressure of 15 pounds per square inch has a temperature of about 248° F. The tubular shaft 11 is driven by a gear 15, engaging a smaller gear 16, driven by a motor 17. The basic carbonate white lead pulp is now introduced into a feed hopper 18, having communication with the interior of the vacuum casing or shell 5, through a pipe 19, provided with a control valve 20. The numeral 21 designates a discharge gate or closure element, adapted to be held in the closed position by any suitable means and forming an air-tight joint when in the closed position. With the gate 21 closed, and the suitable vacuum maintained within the receptacle or shell 5, valve 20 is opened, whereby the pulp will be drawn into the shell 5, the valve being subsequently closed for maintaining the desired degree of vacuum. Within the shell 5, this pulp is now subjected to the action of heat, in the presence of the vacuum and agitation. The treatment is continued until all the water has been vaporized from the basic carbonate white lead and a resultant dry basic carbonate white lead powdered pigment produced. When the drying has been completed, gate 21 is opened and the powdered pigment withdrawn.

The basic carbonate white lead powdered pigment produced by my method will be found to have new and unexpected properties. Its oil absorption capacity has been materially reduced and also its bodying action materially reduced. Tests which I have made show that the basic carbonate white lead powdered pigment, produced by my method, has a reduced oil absorption capacity and required only about 10% of oil by weight to grind the pigment to a paste, and further the pigment produced by my method had a reduced bodying action. I have treated the same basic carbonate white lead pulp, in a similar manner, except that it was dried by heat at atmospheric pressure. The basic carbonate white lead powdered pigment thus obtained, required 12% of oil by weight to grind the same to a paste and produce a paint of noticeably heavier body. The tests which I have conducted clearly indicated that the characteristics of the resultant basic carbonate white lead powdered pigment are changed by the thorough washing of the basic carbonate white lead pulp and subsequent heat treatment under vacuum to dry the same, this change being indicated by the reduced oil absorption capacity and reduced bodying action.

I have also found that satisfactory results cannot be obtained in producing the basic carbonate white lead powdered pigment unless the soluble salts present with the basic carbonate white lead pulp are first removed by thorough washing. The presence of water soluble lead acetate in the basic carbonate white lead pulp would prevent the desired change in the characteristics of the resultant basic carbonate white lead powdered pigment, when such pulp is heated under vacuum for drying. A test which I have made shows that the basic carbonate white lead pulp, when not washed for removing the soluble salts including lead acetate, produced a resultant basic carbonate white lead powdered pigment which required 11½% of oil by weight to grind the pigment to a paste, and this pigment produced a paint having a heavier body. The presence of the water soluble lead acetate increases the oil absorption properties of the powdered pigment, which cannot be overcome by the vacuum heat treatment, and the soluble salts can only be removed by washing with water.

Having fully described my invention, what I claim is:

1. The herein described method of producing a dry basic carbonate white lead powdered pigment having a reduced oil absorption capacity and a reduced bodying action, comprising thoroughly washing basic carbonate white lead pulp with water for removing the water soluble salts, separating the pulp from the excess water, and then subjecting the wet pulp to the action of heat and agitation in the presence of a pressure substantially below atmospheric pressure to dry the pulp and produce the powdered pigment.

2. The herein described method of producing a dry basic carbonate white lead powdered pigment having a reduced oil absorption capacity and a reduced bodying action, comprising thoroughly washing basic carbonate white lead pulp with water for removing the water soluble salts, and then subjecting the wet pulp to the action of heat in the presence of a pressure substantially below atmospheric pressure to dry the pulp and produce the powdered pigment.

3. The herein described method of producing a dry basic carbonate white lead powdered pigment having a reduced oil absorption capacity and a reduced bodying action, comprising thoroughly washing basic carbonate white lead pulp with water for removing the water soluble salts, and then subjecting the wet pulp to the action of heat and agitation in the presence of a pressure substantially below atmospheric pressure to dry the pulp and produce the powdered pigment.

4. The herein described method of producing a dry basic carbonate white lead powdered pigment having a reduced oil absorption capacity and a reduced bodying action, comprising thoroughly washing basic carbonate white lead pulp with water for removing substantially all traces of the water soluble salts from the pulp, filter pressing the pulp for removing the excess water, and then subjecting the wet pulp to the action of heat and agitation in the presence of a pressure below atmospheric pressure as indicated by substantially 20 to 25 inches of mercury and continuing the operation until the pulp is dry.

5. The herein described method of producing a dry basic carbonate white lead powdered pigment having a reduced oil absorption capacity and a reduced bodying action, comprising thoroughly washing basic carbonate white lead pulp with water for removing substantially all traces of the water soluble salts from the pulp, filter pressing the pulp thus treated to remove the excess water, and then subjecting the pulp to the heating action of steam under a pressure of substantially 15 pounds per square inch and agitation in the presence of a pressure beneath atmospheric pressure as defined by substantially 20 to 25 inches of mercury, and continuing the operation until the pulp is dry.

6. The herein described method of producing a dry basic carbonate white lead powdered pigment having a reduced oil absorption capacity and a reduced bodying action, comprising washing basic carbonate white lead pulp with water for removing the water soluble salts from the pulp, separating the pulp from the excess water, and subjecting the wet pulp to the action of heat and agitation in the presence of a pressure below atmospheric pressure as indicated by approximately 20 to 25 inches of mercury for a sufficient time to dry the pigment.

7. The herein described method of producing a dry basic carbonate white lead powdered pigment having a reduced oil absorption capacity and a reduced bodying action, comprising washing basic carbonate white lead pulp with water for removing the water soluble salts from the pulp, separating the pulp from the excess water, and subjecting the wet pulp to the action of heat and agitation in the presence of pressure below atmospheric pressure as indicated by approximately at least 20 inches of mercury.

8. In the herein described method, the steps of washing basic carbonate white lead pulp with water for removing the water soluble salts from the pulp, separating the pulp from the excess water, and subjecting the wet pulp to the action of heat and agitation in the presence of pressure considerably below atmospheric pressure and so near to a pressure as indicated by at least approximately 20 inches of mercury that a dry basic carbonate white lead powdered pigment is produced having a reduced oil absorption capacity and a reduced bodying action.

9. In the herein described method, the steps of washing basic carbonate white lead pulp with water for removing the water soluble salts from the pulp, separating the pulp from the excess water, and subjecting the pulp to the action of heat and agitation in the presence of pressure so considerably below atmospheric pressure that a dry basic carbonate white lead powdered pigment is produced having a reduced oil absorption capacity and a reduced bodying action.

10. In the herein described method, the steps of washing basic carbonate white lead pulp with water for removing the water soluble salts from the pulp, and subjecting the wet pulp to the action of heat and agitation in the presence of a pressure so considerably below atmospheric pressure that the resultant dry basic carbonate white lead powdered pigment has a reduced oil absorption capacity and a reduced bodying action.

EDWARD D. TURNBULL.